US012671809B2

(12) United States Patent
Unno et al.

(10) Patent No.: US 12,671,809 B2
(45) Date of Patent: *Jun. 30, 2026

(54) IMAGE DECODING DEVICE, IMAGE DECODING METHOD, AND PROGRAM

(71) Applicant: KDDI CORPORATION, Tokyo (JP)

(72) Inventors: Kyohei Unno, Fujimino (JP); Kei Kawamura, Fujimino (JP); Sei Naito, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/023,983

(22) Filed: Jan. 16, 2025

(65) Prior Publication Data

US 2026/0039814 A1 Feb. 5, 2026

Related U.S. Application Data

(63) Continuation of application No. 18/596,513, filed on Mar. 5, 2024, now Pat. No. 12,238,282, which is a (Continued)

(30) Foreign Application Priority Data

Jun. 20, 2019 (JP) ................................ 2019-114961
Nov. 18, 2020 (JP) ................................ 2020-191512

(51) Int. Cl.
*H04N 19/117* (2014.01)
*H04N 19/184* (2014.01)
(Continued)

(52) U.S. Cl.
CPC ......... *H04N 19/117* (2014.11); *H04N 19/184* (2014.11); *H04N 19/186* (2014.11); *H04N 19/30* (2014.11); *H04N 19/82* (2014.11)

(58) Field of Classification Search
CPC .................................................. H04N 19/117
(Continued)

(56) References Cited

U.S. PATENT DOCUMENTS

2020/0236381 A1* 7/2020 Chujoh ................ H04N 19/186
2020/0374518 A1* 11/2020 Hu ......................... H04N 19/82

FOREIGN PATENT DOCUMENTS

WO 2020126411 A1 6/2020

OTHER PUBLICATIONS

Extended European Search Report and Opinion dated Apr. 30, 2025, from Corresponding European Application No. 25154458.1.

(Continued)

*Primary Examiner* — Amir Shahnami
(74) *Attorney, Agent, or Firm* — Troutman Pepper Locke LLP

(57) ABSTRACT

An image decoding device, includes a filter unit using, as an input, a decoded signal prior to the filtering process and output a filtered decoded signal. The filter unit performs clipping processing on the decoded signal prior to the filtering process such that the absolute value of a differential value between a reference pixel value and a pixel value of the decoded signal prior to the filtering process is less than or equal to a predefined threshold value, and to generate the filtered decoded signal through the linear weighted addition of the value after the clipping processing is performed and the pixel value of the decoded signal prior to the filtering process; and a large-small relationship between the threshold value for a luma signal and the threshold value for a chroma signal are defined such that the large-small relationship is unchanged when an internal bit depth is changed.

3 Claims, 11 Drawing Sheets

Related U.S. Application Data continuation of application No. 17/855,218, filed on Jun. 30, 2022, now Pat. No. 11,949,860, which is a continuation of application No. 17/187,025, filed on Feb. 26, 2021, now Pat. No. 11,412,219, which is a continuation of application No. PCT/JP2020/022975, filed on Jun. 11, 2020.

(51) Int. Cl.

*H04N 19/186* (2014.01)
*H04N 19/30* (2014.01)
*H04N 19/82* (2014.01)

(58) Field of Classification Search

USPC .................................................... 375/240.02
See application file for complete search history.

(56) References Cited

OTHER PUBLICATIONS

Extended European Search Report and Opinion dated Apr. 30, 2025, from Corresponding European Application No. 25154460.7.

Extended European Search Report and Opinion dated Apr. 30, 2025, from Corresponding European Application No. 25154459.9.

Extended European Search Report and Opinion dated Apr. 30, 2025, from Corresponding European Application No. 25154461.5.

McCann et al., "HM7: High Efficiency Video Coding (HEVC) Test Model 7 Encoder Description", Joint Collaborative Team on Video Coding (JCT-VC), Document: JCTVC-11002, 9th Meeting in Geneva Apr. 27, 2012-May7, 2012.

Email regarding Examiner's Confirmation of Correct D3 References in Extended European Search Report and Opinion.

Bross, B., et al., "Versatile Video Coding (Draft 5)" JVET-N1001-v7, 18 pages (Mar. 2019).

Taquet, J. et al., "CE5: Results of tests CE5-3.1 to CE5-3.4 on Non-Linear Adaptive loop Filter" JVET-N0242, 11 Pages (Mar. 2019).

Unno, K., et al., "Non-CE5: A simplification of clipping thresholds for Non-Linear ALF" JVET-00386-v2, 7 pages (Jul. 2019).

Hu, N., et al. "Non-CE5: Simplication on clipping value calculation for adaptive loop filter" JVET-0532-v1, 5 pages (Jul. 2019).

International Search Report issued in corresponding International Patent Application No. PCT/JP2020/022975 dated Aug. 11, 2020.

* cited by examiner

LUMA SIGNAL

CHROMA SIGNAL

FIG. 6A

| index | THRESHOLD VALUE FOR LUMA SIGNAL | THRESHOLD VALUE FOR CHROMA SIGNAL |
|---|---|---|
| 0 | 1024 × 2^(bitdepth – 10) | 1024 × 2^(bitdepth – 10) |
| 1 | 181 × 2^(bitdepth – 10) | 161 × 2^(bitdepth – 10) |
| 2 | 32 × 2^(bitdepth – 10) | 25 × 2^(bitdepth – 10) |
| 3 | 6 × 2^(bitdepth – 10) | 4 × 2^(bitdepth – 10) |

FIG. 6B

| index | THRESHOLD VALUE FOR LUMA SIGNAL | THRESHOLD VALUE FOR CHROMA SIGNAL |
|---|---|---|
| 0 | Th_shift (1024) | Th_shift (1024) |
| 1 | Th_shift (181) | Th_shift (161) |
| 2 | Th_shift (32) | Th_shift (25) |
| 3 | Th_shift (6) | Th_shift (4) |

```
Th_shift (a) = bitdepth >= 10 ?
          a << (bitdepth – 10)
          : (a + (1 << (10 –  bitdepth - 1) ) ) >> (10 - bitdepth)
```

FIG. 7

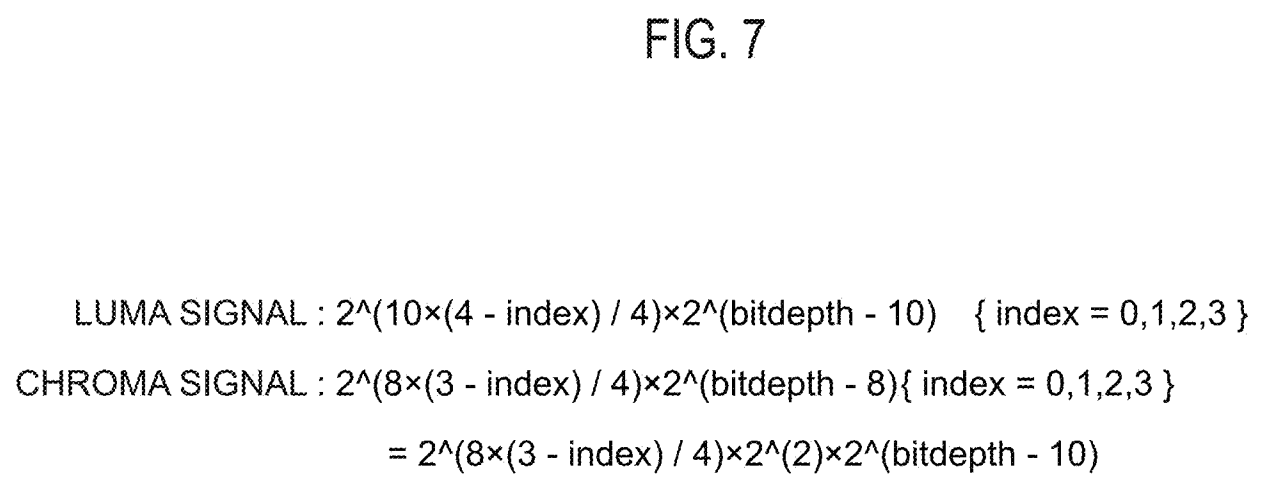

LUMA SIGNAL : 2^(10×(4 - index) / 4)×2^(bitdepth - 10) { index = 0,1,2,3 }

CHROMA SIGNAL : 2^(8×(3 - index) / 4)×2^(bitdepth - 8){ index = 0,1,2,3 }

= 2^(8×(3 - index) / 4)×2^(2)×2^(bitdepth - 10)

IMAGE DECODING DEVICE, IMAGE DECODING METHOD, AND PROGRAM

CROSS-REFERENCE TO RELATED APPLICATIONS

The present application is a continuation based on U.S. application Ser. No. 18/596,513, filed Mar. 5, 2024, which is a continuation of U.S. patent application Ser. No. 17/855,218, filed Jun. 30, 2022, now U.S. Pat. No. 11,949,860, which is a continuation based on U.S. patent application Ser. No. 17/187,025, filed Feb. 26, 2021, now U.S. Pat. No. 11,412,219, which is a continuation based on PCT Application No. PCT/JP2020/022975, filed on Jun. 11, 2020, which claims the benefit of Japanese patent application No. 2019-114961 filed on Jun. 20, 2019 and Japanese patent application No. 2020-191512 filed on Nov. 18, 2020. The entire contents of which are hereby incorporated by reference.

TECHNICAL FIELD

The present invention relates to an image decoding device, an image decoding method, a program.

BACKGROUND

Conventionally, a technology for implementing nonlinear filter processing by using threshold values to clip input signals inputted to an "adaptive loop filter (ALF)" is known (see Versatile Video Coding (Draft 5), JVET-N1001, for example).

Here, the threshold values are defined using a mathematical formula, and final values are derived according to a set value, or the like, for the internal bit depth. The threshold values are defined for a luma signal and a chroma signal, respectively.

SUMMARY

However, in the case of the foregoing conventional technology, a large-small relationship between a threshold value for a luma signal and a threshold value for a chroma signal is reversed by the internal bit depth. Accordingly, there has been a problem in that the characteristics of a decoded image vary according to the internal bit depth setting, even for identical input signals, thus potentially affecting the subjective image quality.

Therefore, the present invention was conceived in view of the foregoing problem, and an object thereof is to provide an image decoding device, an image decoding method, and a program that make it possible to prevent a situation where the characteristics of a decoded image vary and the subjective image quality is affected.

The first aspect of the present invention is summarized as an image decoding device, including: a circuit configured to use, as an input, a decoded signal prior to the filtering process and output a filtered decoded signal, wherein the circuit is configured to perform clipping processing on the decoded signal prior to the filtering process such that the absolute value of a differential value between a reference pixel value and a pixel value of the decoded signal prior to the filtering process is less than or equal to a predefined threshold value, and to generate the filtered decoded signal through the linear weighted addition of the value after the clipping processing is performed and the pixel value of the decoded signal prior to the filtering process; and a large-small relationship between the threshold value for a luma signal and the threshold value for a chroma signal are defined such that the large-small relationship is unchanged when an internal bit depth is changed.

The second aspect of the present invention is summarized as an image decoding method, including: a step of using, as an input, a decoded signal prior to the filtering process and outputting a filtered decoded signal, wherein in this step, clipping processing is performed on the decoded signal prior to the filtering process such that the absolute value of a differential value between a reference pixel value and a pixel value of the decoded signal prior to the filtering process is less than or equal to a predefined threshold value, and the filtered decoded signal is generated through the linear weighted addition of the value after the clipping processing is performed and the pixel value of the decoded signal prior to the filtering process, and a large-small relationship between the threshold value for a luma signal and the threshold value for a chroma signal are defined such that the large-small relationship is unchanged when an internal bit depth is changed.

The third aspect of the present invention is summarized as a program used by an image decoding device, the program causing a computer to: execute a step of using, as an input, a decoded signal prior to the filtering process and outputting a filtered decoded signal, wherein in this step, clipping processing is performed on the decoded signal prior to the filtering process such that the absolute value of a differential value between a reference pixel value and a pixel value of the decoded signal prior to the filtering process is less than or equal to a predefined threshold value, and the filtered decoded signal is generated through the linear weighted addition of the value after the clipping processing is performed and the pixel value of the decoded signal prior to the filtering process, and a large-small relationship between the threshold value for a luma signal and the threshold value for a chroma signal are defined such that the large-small relationship is unchanged when an internal bit depth is changed.

According to the present invention, it is possible to provide an image decoding device, an image decoding method, and a program that make it possible to prevent a situation where the characteristics of a decoded image vary and the subjective image quality is affected.

BRIEF DESCRIPTION OF DRAWINGS

FIGS. 6A and 6B are diagrams to illustrate an example of functions of the filter unit 150B of the in-loop filter processing unit 150 of the image encoding device 100 according to the first embodiment.

FIG. 7 is a diagram to illustrate an example of functions of the filter unit 150B of the in-loop filter processing unit 150 of the image encoding device 100 according to the first embodiment.

DETAILED DESCRIPTION

An embodiment of the present invention will be explained hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

Figure 1:
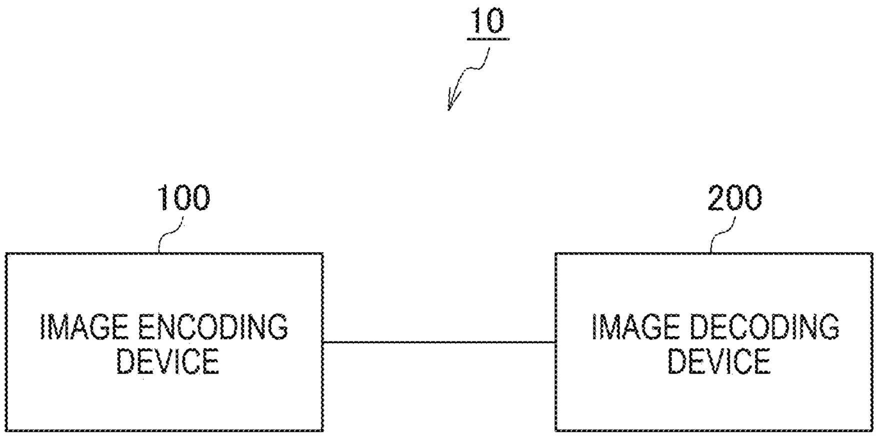
FIG. 1 is a diagram illustrating an example of a configuration of an image processing system 10 according to a first embodiment.

An image processing system 10 according to a first embodiment of the present invention is explained below with reference to FIG. 1 to FIG. 10. FIG. 1 is a diagram illustrating the image processing system 10 according to an embodiment according to this embodiment.

As illustrated in FIG. 1, the image processing system 10 includes an image encoding device 100 and an image decoding device 200.

The image encoding device 100 is configured to encode an input image signal to thereby generate encoded data. The image decoding device 200 is configured to decode the encoded data to generate an output image signal.

Such encoded data may be transmitted from the image encoding device 100 to the image decoding device 200 via a transmission line. The encoded data may be stored in a storage medium and then provided from the image encoding device 100 to the image decoding device 200.

Figure 2:
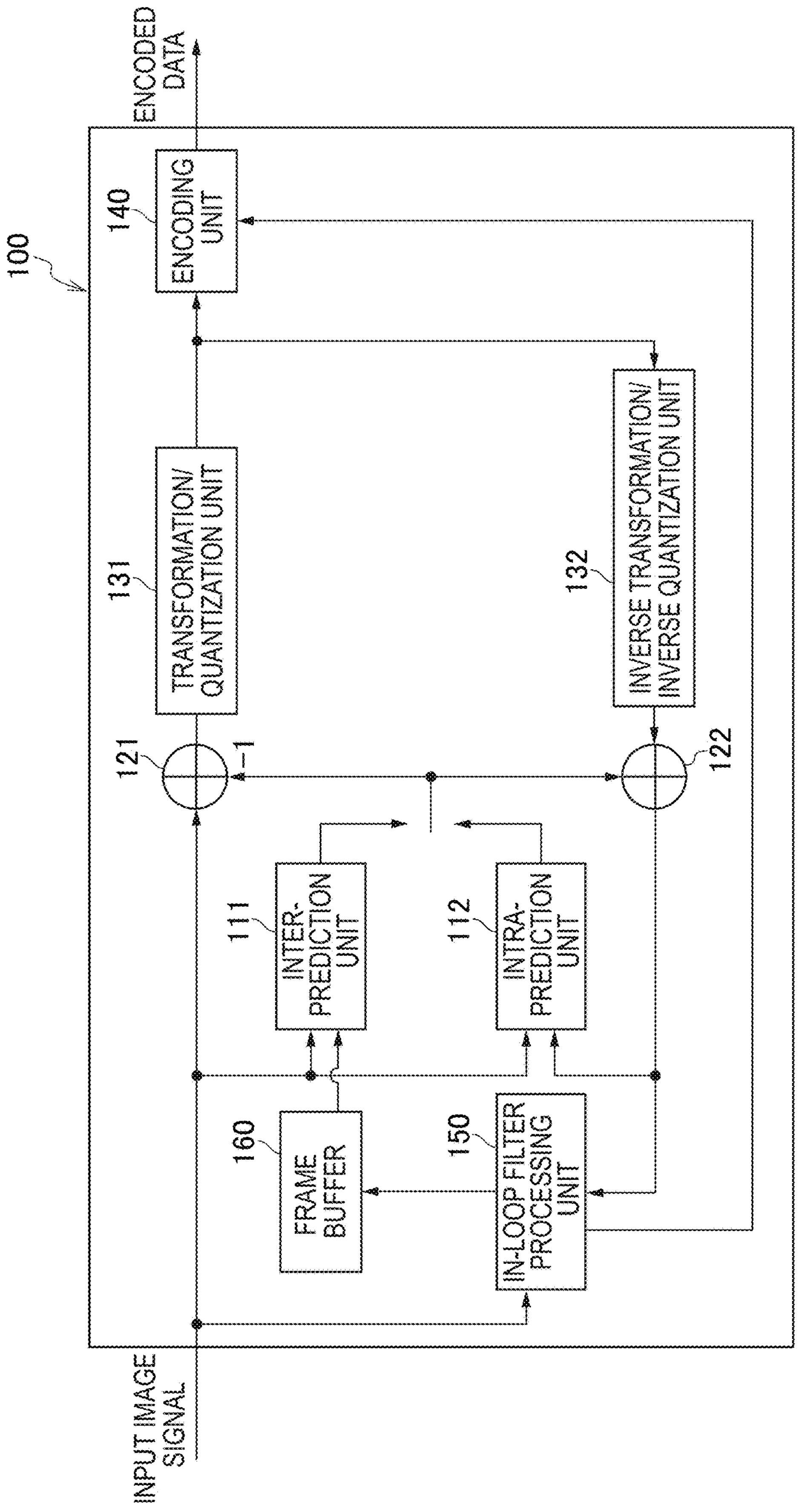
FIG. 2 is a diagram illustrating an example of function blocks of an image encoding device 100 according to the first embodiment.

The image encoding device 100 according to this embodiment is explained below with reference to FIG. 2. FIG. 2 is a diagram illustrating an example of functional blocks of the image encoding device 100 according to this embodiment.

As illustrated in FIG. 2, the image encoding device 100 includes an inter prediction unit 111, an intra prediction unit 112, a subtractor 121, an adder 122, a transformation/quantization unit 131, an inverse transformation/inverse quantization unit 132, an encoding unit 140, an in-loop filter processing unit 150, and a frame buffer 160.

The inter prediction unit 111 is configured to generate a prediction signal through inter prediction (inter-frame prediction).

Specifically, the inter prediction unit 111 is configured to specify, through comparison of an encoding target frame (hereinafter, target frame) and a reference frame stored in the frame buffer 160, a reference block included in the reference frame and determine a motion vector with respect to the specified reference block.

The inter prediction unit 111 is configured to generate, based on the reference block and the motion vector, for each prediction block, the prediction signal included in the prediction block. The inter prediction unit 111 is configured to output the prediction signal to the subtractor 121 and the adder 122. The reference frame is a frame different from the target frame.

The intra prediction unit 112 is configured to generate the prediction signal through intra prediction (intra-frame prediction).

Specifically, the intra prediction unit 112 is configured to specify the reference block included in the target frame and generate, for each prediction block, the prediction signal based on the specified reference block. The intra prediction unit 112 is configured to output the prediction signal to the subtractor 121 and the adder 122.

The reference block is a block referred to about a prediction target block (hereinafter, target block). For example, the reference block is a block adjacent to the target block.

The subtractor 121 is configured to subtract the prediction signal from the input image signal and output a prediction remainder signal to the transformation/quantization unit 131. The subtractor 121 is configured to generate the prediction remainder signal, which is a difference between the prediction signal generated by the intra prediction or the inter prediction and the input image signal.

The adder 122 is configured to add the prediction signal to the prediction remainder signal output from the inverse transformation/inverse quantization unit 132 to generate a decoded signal prior to the filtering process and output such a decoded signal prior to the filtering process to the intra prediction unit 112 and the in-loop filter processing unit 150.

The decoded signal prior to the filtering process configures the reference block used in the intra prediction unit 112.

The transformation/quantization unit 131 is configured to perform transformation processing of the prediction remainder signal and acquire a coefficient level value. Further, the transformation/quantization unit 131 may be configured to perform quantization of the coefficient level value.

The transformation processing for transforming the prediction remainder signal into a frequency component signal. In such transformation processing, a base pattern (a transformation matrix) corresponding to discrete cosine transform (DCT) may be used or a base pattern (a transformation matrix) corresponding to discrete sine transform (DST) may be used.

The inverse transformation/inverse quantization unit 132 is configured to perform inverse transformation processing of the coefficient level value output from the transformation/quantization unit 131. The inverse transformation/inverse quantization unit 132 is configured to perform inverse quantization of the coefficient level value prior to the inverse transformation processing.

The inverse transformation processing and the inverse quantization are performed in a procedure opposite to the transformation processing and the quantization performed in the transformation/quantization unit 131.

The encoding unit 140 is configured to encode the coefficient level value output from the transformation/quantization unit 131 and output encoded data.

For example, the encoding is entropy encoding for allocating a code of different length based on an occurrence probability of the coefficient level value.

The encoding unit 140 is configured to encode, in addition to the coefficient level value, control data used in decoding processing.

The control data may include size data such as an encoding block (CU: Coding Unit) size, a prediction block (PU: Prediction Unit) size, and a transformation block (TU: Transform Unit) size.

The in-loop filter processing unit 150 is configured to perform filter processing on the decoded signal prior to the filtering process output from the adder 122 and output a filtered decoded signal to the frame buffer 160.

Furthermore, an in-loop filter processing unit 150 may be configured to determine parameters related to filter processing by using, as inputs, an input image signal and a decoded signal prior to the filtering process and to output the parameters to an encoding unit 140. The encoding unit 140 may be configured to encode these parameters and transmit same as additional information to an image decoding device 200.

Here, for example, the filter processing is adaptive loop filter processing to reduce coding distortion of a decoded image.

The frame buffer 160 is configured to accumulate the reference frame used in the inter prediction unit 111.

The filtered decoded signal configures the reference frame used in the inter prediction unit 111.

Figure 3:
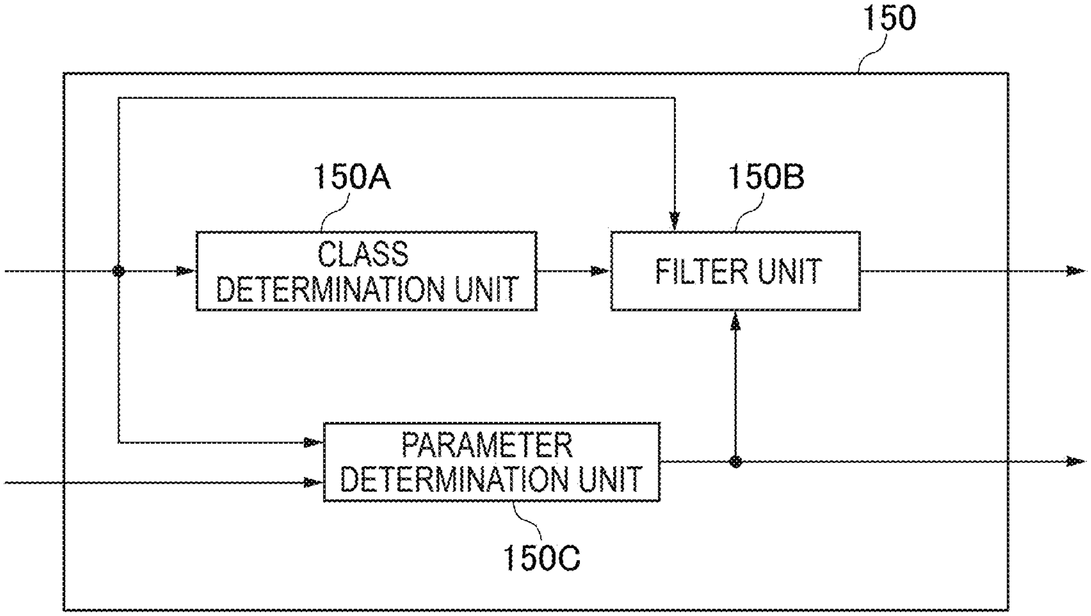
FIG. 3 is a diagram illustrating an example of function blocks of an in-loop filter processing unit 150 of the image encoding device 100 according to the first embodiment.

An in-loop filter processing unit 150 according to the present embodiment will be described hereinbelow. FIG. 3 is a diagram illustrating an in-loop filter processing unit 150 according to the present embodiment.

As illustrated in FIG. 3, the in-loop filter processing unit 150 has a class determination unit 150A, a filter unit (circuit) 150B, and a parameter determination unit 150C.

The in-loop filter processing unit 150 is capable of selecting either the application or non-application of adaptive loop filter processing in coding tree blocks (coding tree units (CTU)). Furthermore, when adaptive loop filter processing is applied, the in-loop filter processing unit 150 is capable of selecting usage of any filter set among a plurality of filter sets.

The filter sets each include a filter for a maximum of 25 types (classes) of luma signal, and a filter for one class of chroma signal.

Parameters that include information pertaining to the application or non-application of the adaptive loop filter processing and information pertaining to the filter set to be used for the adaptive loop filter processing, or the like, are encoded for each CTU as additional information and transmitted to the image decoding device 200, as will be described subsequently. Note that the parameters are determined by the parameter determination unit 150C, as will be described subsequently.

Here, when input signals are in the "YCbCr4:2:0 format", for example, the CTUs may be defined as blocks which are obtained by dividing a luma (Y) signal using a 128× 128 pixel size and chroma (Cb, Cr) signals using a 64×64 pixel size, for example.

Note that, for pixels of a luma signal and a chroma signal which belong to CTUs for which it is determined that adaptive loop filter processing is not to be applied, the determination processing by the class determination unit 150A and the filter processing by the filter unit 150B, which will be described subsequently, can be omitted.

The class determination unit 150A is configured to use, as an input, a decoded signal prior to the filtering process and to output class determination information indicating which type (class) of filter is to be used among a predetermined plurality of types of filters (adaptive loop filters).

Here, the class determination unit 150A is configured to divide the decoded signal prior to the filtering process into small blocks and determine the class to be used for each of the blocks. For example, the class determination unit 150A is capable of determining, for each 4×4 pixel block, which class of filter is to be used from among 25 types.

Here, any determination method can be used as the class determination method as long as the method enables a determination to be made by using, as an input, only information that is obtained on both the image encoding device 100 side and the image decoding device 200 side.

For example, in Versatile Video Coding (Draft 5), JVET-N1001, the foregoing class determination is made by using the gradient of the pixel values of the decoded signal prior to the filtering process. By using only the information that is obtained on both the image encoding device 100 side and the image decoding device 200 side, the same class determination can be made on both the image decoding device 200 side and the image encoding device 100 side, and hence there is no need to transmit the class determination information from the image encoding device 100 side to the image decoding device 200 side.

The filter unit 150B is configured to use a decoded signal prior to the filtering process as an input and to output a filtered decoded signal.

More specifically, the filter unit 150B is configured to perform filter processing by using, as an input, a decoded signal prior to the filtering process, class determination information outputted from the class determination unit 150A, and parameters (a loop filter processing parameter group) inputted from the parameter determination unit 150C, and to output a filtered decoded signal.

The values of each pixel of the filtered decoded signal can be calculated using the following equation, for example.

$$O(x, y) = I(x, y) + \sum_{(i,j)\neq(0,0)} C(i, j)\cdot K(I(x+i, y+j) - (x, y), k(i, j)) \qquad \text{Equation 1}$$

Here, I(x, y) is a pixel value of the decoded signal prior to the filtering process at a coordinate (x, y); O(x, y) is a pixel value of the filtered decoded signal at coordinate (x, y); (i, j) is a coordinate indicating the relative position of a reference pixel with respect to a pixel at coordinate (x, y) (a reference pixel position); C(i, j) is a filter coefficient corresponding to the reference pixel position (i, j); K( ) is clipping processing as indicated hereinbelow; and k(i j) is a threshold value used in the clipping processing.

$$K(I, k) = \min(k, \max(-k, I))$$

Here, min( ) is a function to return the minimum value in the argument, and max( ) is a function to return the maximum value in the argument. Therefore, K( ) is processing that returns −k when the input value I is smaller than −k, returns k when the input value I is greater than k, and otherwise returns the input value I as is.

That is, the filter unit 150B is configured to perform the clipping processing with respect to the decoded signal prior to the filtering process so that the absolute value of a differential value between the reference pixel value I(x+i, y+j) and the pixel value I(x, y) of the decoded signal prior to the filtering process is less than or equal to the predefined threshold value k(i, j).

In addition, the filter unit 150B is configured to generate the filtered decoded signal through the linear weighted addition of the value after the clipping processing is performed and the pixel value I(x, y) of the decoded signal prior to the filtering process.

Figure 4A:
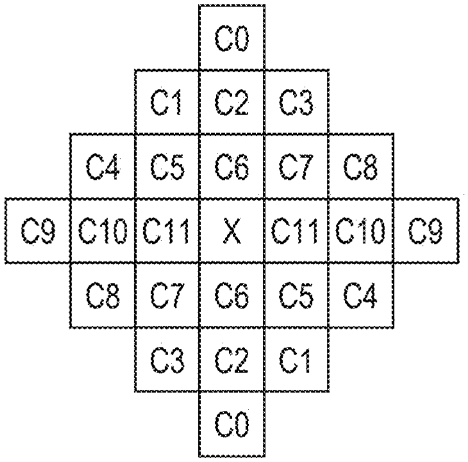
FIGS. 4A and 4B are diagrams to illustrate an example of functions of a filter unit 150B of the in-loop filter processing unit 150 of the image encoding device 100 according to the first embodiment.
Figure 4B:
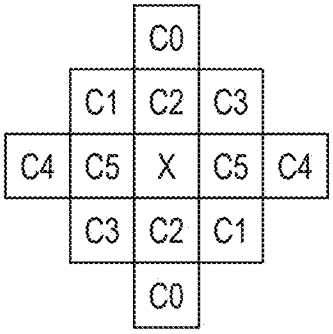

A filter coefficient C is determined by the parameter determination unit 150C and transmitted to the image decoding device 200 side. In order to reduce the code amount of information pertaining to the filter coefficient C, the number of filter coefficients C can be curtailed by applying the same filter coefficient C to a plurality of pixels. FIGS. 4A and 4B illustrate a specific example.

FIG. 4A illustrates an example of the arrangement of filter coefficients C in the filter processing of a luma signal, and FIG. 4B illustrates an example of the arrangement of filter coefficients C in the filter processing of a chroma signal.

As illustrated in FIG. 4A, twelve types of filter coefficients C0 to C11 are used for the luma signal, for example. In FIG. 4A, the pixel labeled X is the pixel position (x, y), the pixel value of which is corrected by the filter processing. Pixels to which the same filter coefficient C is applied are arranged with point symmetry so as to be centered on the pixel position (x, y).

As illustrated in FIG. 4B, for a chroma signal, the other filter coefficients are similarly arranged with point symmetry so as to be centered on the pixel labeled X.

For example, when a reference pixel is a pixel outside the picture, filter processing can be achieved by copying (known as padding) a pixel value of a decoded signal prior to the filtering process located at the picture boundary.

Figure 5A:
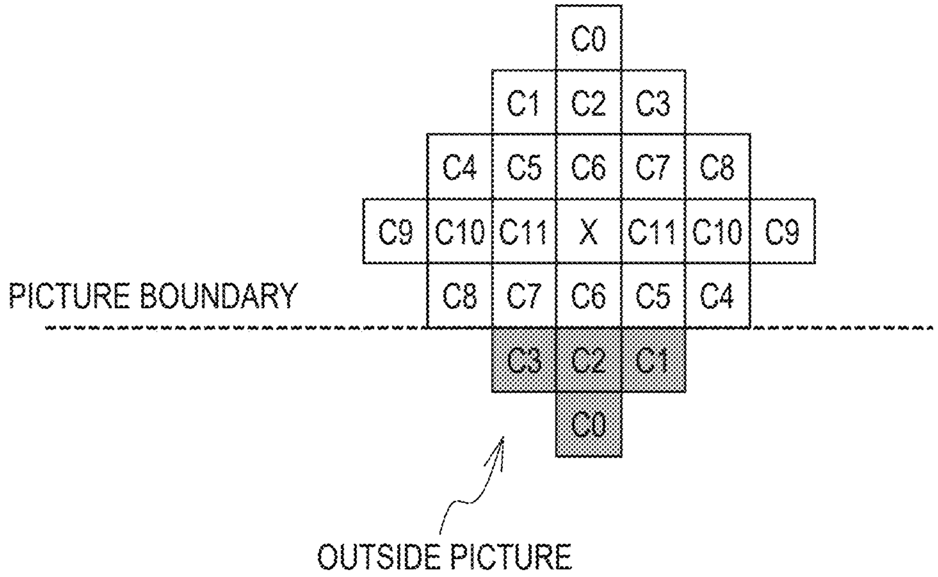
FIGS. 5A and 5B are diagrams to illustrate an example of functions of the filter unit 150B of the in-loop filter processing unit 150 of the image encoding device 100 according to the first embodiment.
Figure 5B:
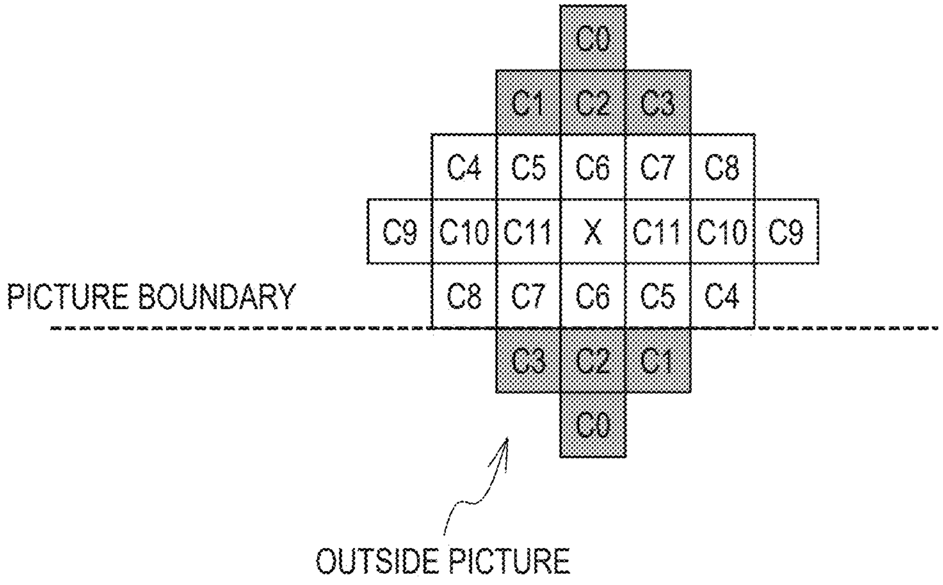

Here, FIGS. 5A and 5B illustrate an example of filter processing at the lower edge of the picture (at the picture boundary).

In FIG. 5A, the grayed-out filter coefficients C0 to C3 refer to pixels outside the picture. At such time, the same pixel value as the pixel value corresponding to filter coefficient C6 which is disposed directly above filter coefficient C2 in FIG. 5A is used as the input for the grayed-out filter coefficients C2 and C0.

Similarly, the same pixel value as the pixel value corresponding to filter coefficient C7, which is disposed directly above filter coefficient C3 in FIG. 5A, is used as the input for the grayed-out filter coefficient C3, and the same pixel value as the pixel value corresponding to filter coefficient C5, which is disposed directly above filter coefficient C1 in FIG. 5A, is used as the input for the grayed-out filter coefficient C1.

Furthermore, when a padded value is used in one part of the reference pixel by considering the point symmetry of the foregoing filter coefficients C, a padded value can also be used as an input for a filter coefficient C in a position which corresponds to the reference pixel.

In the example of FIG. 5B, in addition to the filter processing at the lower edge of the picture illustrated in FIG. 5A, a padded value may also be inputted for the grayed-out filter coefficients C0 to C3.

For example, a pixel value corresponding to the filter coefficient C6 directly below filter coefficient C2 may also be used as padding as an input for the filter coefficients C0 and C2 in FIG. 5B.

Similarly, pixel values corresponding to filter coefficients C5 and C7 directly below filter coefficients C1 and C3 may also be used as padding as an input for the filter coefficients C1 and C3, respectively.

Although filter processing at the lower edge of the picture was described in the foregoing example, the same filter processing can be applied at the upper edge and at the left and right edges of the picture.

Furthermore, the foregoing filter processing method can be applied to similarly deal with a situation where pixel values cannot be referenced, not only at a picture boundary, but also beyond a boundary, such as a boundary of an encoding parallel processing unit known as a slice or a tile, or a boundary in pipeline processing known as a virtual boundary.

Note that, by performing the same filter processing at boundaries such as the foregoing picture boundary, tile boundary, slice boundary, and virtual boundary, implementation can be simplified in comparison with a case where the processing is different for each boundary.

Furthermore, a threshold value, which is used in clipping processing, is set for each filter class and each filter coefficient C, respectively.

For example, there are 25 classes of luma signal filter and, as mentioned earlier, when there are 12 types of filter coefficients C for each class, a threshold value must be set for each of a maximum of 25×12=300 filter coefficients. The threshold values are determined by the parameter determination unit 150C, described subsequently, and transmitted to the image decoding device 200 side as additional information.

Here, in order to reduce the code amount pertaining to the information relating to these threshold values, it is also possible to encode, as information relating to the threshold values, only index information indicating which threshold value is to be used for each filter coefficient among numerous types of predefined threshold values, instead of transmitting the threshold values.

Furthermore, when four types of threshold values are prepared in advance for a luma signal and for a chroma signal respectively, the threshold values for the luma signal and the threshold values for the chroma signal can be defined as in FIGS. 6A and 6B, for example.

The variance of a luma signal tends to be larger than the variance of a chroma signal, and therefore, as illustrated in FIG. 6A, setting the threshold value for the luma signal as greater than or equal to the threshold value for the chroma signal enables clipping processing that takes into account the characteristics of each signal.

In other words, as per FIG. 6A, even when the internal bit depth ("bitdepth" in FIGS. 6A and 6B) is changed, a large-small relationship between the threshold value for the luma signal and the threshold value for the chroma signal (for example, a relationship in which the luma signal threshold value is greater than or equal to the chroma signal threshold value) are defined such that the large-small relationship is unchanged.

Furthermore, as per FIG. 6A, the threshold value for the luma signal and the threshold value for the chroma signal may also be defined so as to be calculated by being respectively multiplied by the same scaling factor value according to the change in the internal bit depth. Using this configuration, the large-small relationship between the threshold value for the luma signal and the threshold value for the chroma signal can be unchanged even when the internal bit depth is changed, and the same clipping processing can be performed irrespective of the internal bit depth.

Here, the internal bit depth signifies the bit accuracy when calculating the pixel values of a luma signal and a chroma signal during encoding processing and decoding processing. The internal bit depth takes an integer value of 8 to 16 bits, for example, and is transmitted from the image encoding device 100 side to the image decoding device 200 side as additional information.

Moreover, as per FIG. 6A, by defining the scaling factor relating to the internal bit depth as a power of two, it is possible to realize the clipping processing using only bit shifts as per FIG. 6B, thus enabling a reduction in the processing load on the hardware and software.

In other words, the threshold values for the luma signal and the threshold values for the chroma signal may each be defined so as to be calculated using bit-shifts according to the change in internal bit depth.

Note that the threshold value corresponding to the index 0 in FIGS. 6(*a*) and 6(*b*) is the same value as the maximum value that can be achieved using the corresponding internal bit depth. Thus, by selecting this threshold value, the filter coefficient C corresponding to this threshold value is actually equivalent to not performing clipping processing.

In order to obtain results like those of the foregoing example, there is no need to set the scaling factor at the same value for all the threshold values as described earlier. In a predetermined domain for the internal bit depth (8 to 16 bits, for example), the large-small relationship between the threshold values corresponding to the respective indices in the luma signal and the chroma signal is not reversed, and as long as the format of not reversing the large-small relationship of threshold values which correspond to the same index is preserved between the luma signal and chroma signal, even assigning different values to the scaling factors of the respective threshold values is not problematic.

Note that, when N types of luma signal threshold values and chroma signal threshold values, to which indices 0 to N−1 are respectively assigned (where N is a natural number of 1 or more), are provided, a luma signal threshold value and a chroma signal threshold value, which have the same index, may be defined so as to be calculated by being multiplied by the same scaling factor according to the internal bit depth.

In addition, although a case where the threshold values are multiplied by a scaling factor according to the internal bit depth was described in the foregoing example, processing in which an offset value is added instead of a scaling factor is also possible.

Note that, even in a case where the internal bit depth of the luma signal differs from the internal bit depth of the chroma signal, by respectively defining the threshold value for the luma signal and the threshold value for the chroma signal as per FIGS. 6A and 6B, when transformation is performed such that the dynamic ranges of the luma signal and chroma signal are the same, the threshold values can be defined so that the large-small relationship of the threshold values used in the clipping processing between the luma signal and chroma signal is immutable.

Furthermore, although a case in which a threshold value is set for each class and each filter coefficient C was described in the foregoing example, a method is also possible whereby the same threshold value is set for all the filter coefficients C for each class, for example, that is, the threshold values are set one by one for each class. In this case, because the number of threshold values to be transmitted decreases, the code amount pertaining to threshold value indices can be reduced.

Further, as will be described subsequently, because a flag indicating whether to perform clipping processing for each class is transmitted ahead of a threshold value index, when there is only one type of threshold value for each class, there is no need to define a threshold value corresponding to the foregoing index 0 (equivalent to no clipping processing). Thus, in the foregoing example, because the possible patterns for threshold values can be reduced from four types to three types, a further reduction in the code amount pertaining to the threshold value indices is to be expected.

Although a case where different values are set for the threshold value for the luma signal and the threshold value for the chroma signal was described in the foregoing example, both values can also be the same. Accordingly, common circuitry can be adopted as hardware for the clipping processing of the luma signal and chroma signal, for example, thus enabling the circuit scale to be reduced.

In addition, the threshold value for the luma signal and the threshold value for the chroma signal may also be defined so as to be calculated by performing an arithmetic operation according to the current internal bit depth, based on a case where the internal bit depth is ten bits.

For example, an example is illustrated in FIG. 6A where it is possible to obtain the final threshold values by multiplying same by a power of two according to the value of the current internal bit depth (bitdepth in FIGS. 6A and 6B), based on a case where there are four types of threshold values, namely, 1024, 181, 32, and 6 when the luma signal is ten bits and where there are four types of threshold values, namely, 1024, 161, 25, and 4 when the chroma signal is ten bits.

Here, in FIGS. 6A and 6B, although the threshold values when there are ten bits are expressed by numerical values (1024, 181, and so forth), the threshold values may also be defined using a mathematical formula.

For example, as illustrated in FIG. 7, the threshold values when the luma signal is ten bits are given by "2^(10 (10×(4−index)/4)" (here, index=0,1,2,3)) and may also be defined so as to obtain final threshold values according to the current internal bit depth by multiplying the threshold values by "2^(bitdepth−10)".

Similarly also for the definition of the chroma signal illustrated in FIG. 7, "2^(8× (3−index)/4)×2^(2)" is the threshold value when there are ten bits, and calculation of the threshold values according to the current internal bit depth by multiplying the threshold values by "2^(bitdepth−10)" may also be considered.

The parameter determination unit 150C is configured to determine adaptive loop filter-related parameters and output same to the encoding unit 140 as additional information by using, as inputs, an input image signal and a decoded signal prior to the filtering process, and to output the parameters thus determined to the filter unit 150B.

The parameters determined by the parameter determination unit 150C include the following, for example.

First, examples of these parameters include filter sets in frame units. Here, one filter set contains a maximum of 25 classes' worth of luma signal filters and one class's worth of chroma signal filters. For the filters of each class, a filter coefficient value, a flag indicating whether to perform clipping processing, and an index or the like for the threshold value used in the clipping processing for each filter coefficient when the clipping processing is performed for the class are determined.

The parameter determination unit 150C holds a plurality of filter sets for a certain frame and, as described subsequently, is capable of selecting usage of any filter set for each region.

Second, examples of such parameters include a flag indicating whether to apply an adaptive loop filter for each CTU, for example. Note that, when an adaptive loop filter is applied, the parameter determination unit 150C is capable of setting index information indicating which among the plurality of filter sets is to be used.

Note that, because a known method can be used as the method for determining these parameters, the details are omitted.

Furthermore, although not illustrated in FIG. 3, the parameter determination unit 150C may, in the parameter determination, use the determination results by the class determination unit 150A, and the results of the filter unit 150B carried out using provisional parameter settings.

Figure 8:
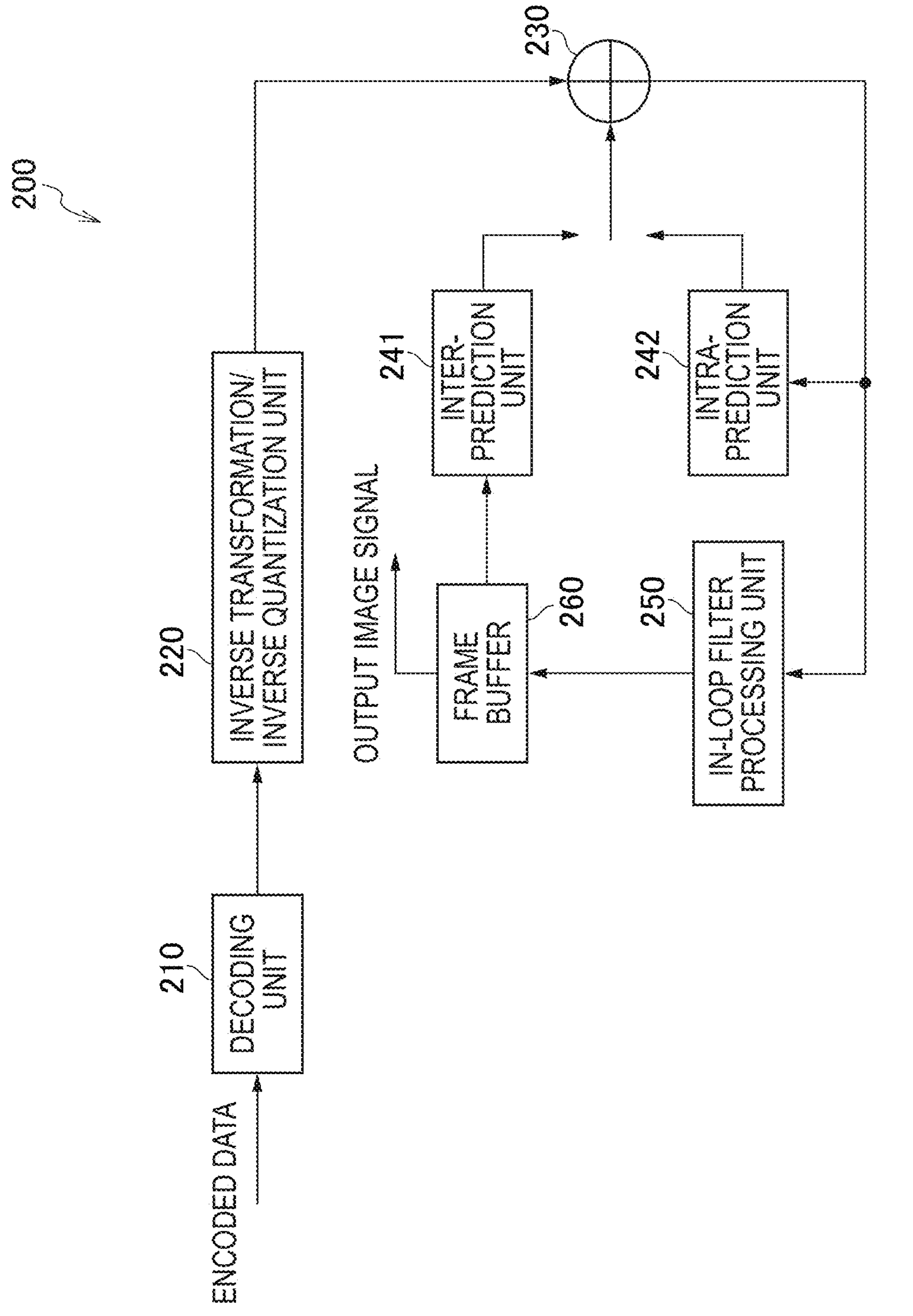
FIG. 8 is a diagram illustrating an example of function blocks of an image decoding device 200 according to the first embodiment.

The image decoding device 200 according to this embodiment is explained below with reference to FIG. 8. FIG. 8 is a diagram illustrating an example of functional blocks of the image decoding device 200 according to this embodiment.

As illustrated in FIG. 8, the image decoding device 200 includes a decoding unit 210, an inverse transformation/inverse quantization unit 220, an adder 230, an inter prediction unit 241, an intra prediction unit 242, an in-loop filter processing unit 250, and a frame buffer 260.

The decoding unit 210 is configured to decode encoded data generated by the image encoding device 100 and decode a coefficient level value.

For example, the decoding is entropy decoding in a procedure opposite to the entropy encoding performed by the encoding unit 140.

The decoding unit 210 may be configured to acquire control data through decoding processing of the encoded data.

Note that, as explained above, the control data may include size data such as an encoding block size, a prediction block size, and a transform block size.

The inverse transformation/inverse quantization unit 220 is configured to perform inverse transformation processing of the coefficient level value output from the decoding unit 210. The inverse transformation/inverse quantization unit 220 may be configured to perform inverse quantization of the coefficient level value prior to the inverse transformation processing.

The inverse transformation processing and the inverse quantization are performed in a procedure opposite to the transformation processing and the quantization performed in the transformation/quantization unit 131.

The adder 230 is configured to add a prediction signal to a prediction remainder signal output from the inverse transformation/inverse quantization unit 220 to generate a decoded signal prior to the filtering process and output the decoded signal prior to the filtering process to the intra prediction unit 242 and the in-loop filter processing unit 250.

The decoded signal prior to the filtering process configures a reference block used in the intra prediction unit 242.

Like the inter prediction unit 111, the inter prediction unit 241 is configured to generate a prediction signal through inter prediction (inter-frame prediction).

Specifically, the inter prediction unit 241 is configured to generate, for each prediction block, a prediction signal based on the motion vector decoded from the encoded data and the reference signal included in the reference frame. The inter prediction unit 241 is configured to output the prediction signal to the adder 230.

Like the intra prediction unit 112, the intra prediction unit 242 is configured to generate a prediction signal through intra prediction (intra-frame prediction).

Specifically, the intra prediction unit 242 is configured to specify a reference block included in a target frame and generate, for each prediction block, a prediction signal based on the specified reference block. The intra prediction unit 242 is configured to output the prediction signal to the adder 230.

Like the in-loop filter processing unit 150, the in-loop filter processing unit 250 is configured to perform filter processing on the decoded signal prior to the filtering process output from the adder 230 and output a filtered decoded signal to the frame buffer 260.

Here, for example, the filter processing is adaptive loop filter processing to reduce coding distortion of a decoded image.

Like the frame buffer 160, the frame buffer 260 is configured to accumulate the reference frame used in the inter prediction unit 241.

The filtered decoded signal configures the reference frame used in the inter prediction unit 241.

Figure 9:
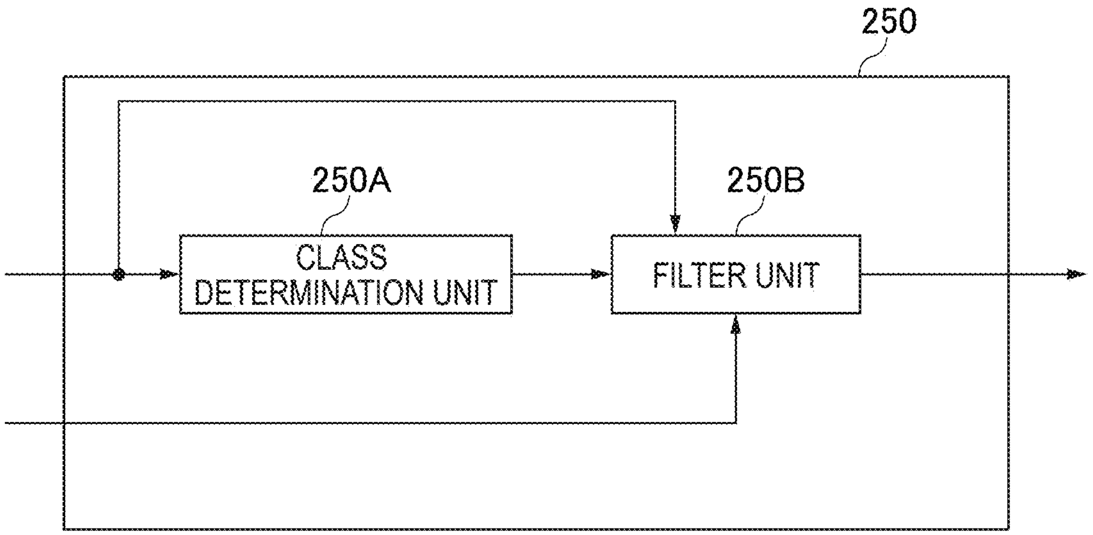
FIG. 9 is a diagram illustrating an example of function blocks of an in-loop filter processing unit 250 of the image decoding device 200 according to the first embodiment.

An in-loop filter processing unit 250 according to the present embodiment will be described hereinbelow. FIG. 9 is a diagram illustrating an in-loop filter processing unit 250 according to the present embodiment.

As illustrated in FIG. 9, the in-loop filter processing unit 250 has a class determination unit 250A and a filter unit (circuit) 250B.

The class determination unit 250A is configured, like the class determination unit 150A, to use, as an input, a decoded signal prior to the filtering process and to output class determination information indicating which class of filter is to be used among a predetermined plurality of types of in-loop filters.

The filter unit 250B is configured, like the filter unit 150B, to execute filter processing on the basis of the decoded signal prior to the filtering process, the class determination information determined by the class determination unit 250A, and the parameters transmitted as additional information from the image encoding device 100 side, and to output a filtered decoded signal.

Figure 10:
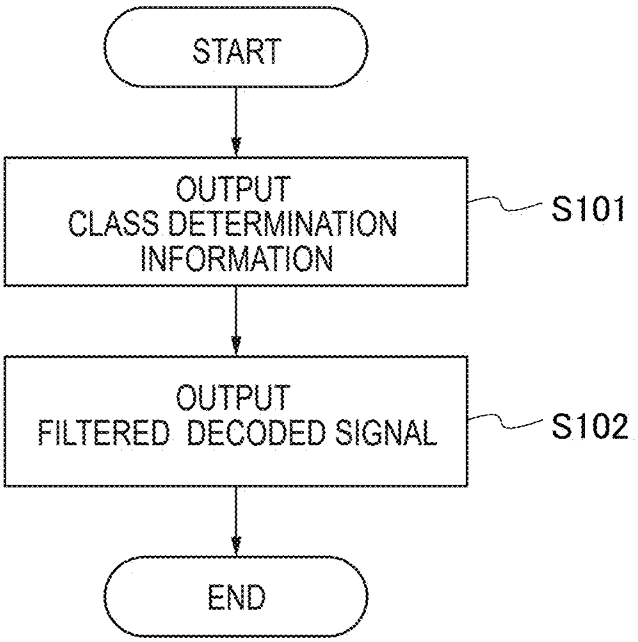
FIG. 10 is a flowchart illustrating an example of a processing procedure of the in-loop filter processing unit 250 of the image decoding device 200 according to the first embodiment.

FIG. 10 is a flowchart illustrating an example of a processing procedure of the in-loop filter processing unit 250 of the image decoding device 200 according to the present embodiment.

As illustrated in FIG. 10, in step S101, the in-loop filter processing unit 250 uses the decoded signal prior to the filtering process as an input and outputs class determination information regarding which class of filter is to be used from among the predetermined plurality of types of in-loop filters.

In step S102, the in-loop filter processing unit 250 executes filter processing on the basis of the decoded signal prior to the filtering process, the class determination information determined by the class determination unit 250A, and the parameters transmitted as additional information from the image encoding device 100 side, and outputs a filtered decoded signal.

In the case of the image encoding device 100 and the image decoding device 200 according to the present embodiment, where the processing of threshold values for input signals of an adaptive interpolation filter is concerned, because the large-small relationship between a threshold value for a luma signal and a threshold value for a chroma signal is immutable when the dynamic ranges of the luma signal and the chroma signal are transformed so as to be the same irrespective of the internal bit depth setting, an unintended variation in the characteristics of the subjective image quality can be prevented.

Also, the image encoding device 10 and the image decoding device 30 described above may be realized by a program which causes a computer to execute functions (processes).

Note that the above described embodiments have been described by taking application of the present invention to the image encoding device 10 and the image decoding device 30 as examples. However, the present invention is not limited only thereto, but can be similarly applied to an encoding/decoding system having functions of the image encoding device 10 and the image decoding device 30.

What is claimed is:

1. An image decoding device, comprising:

a class determination unit configured to use, as an input, a decoded signal prior to a filtering process and determine which class of filter is to be used;

a parameter determination unit configured to determine a filter coefficient for each class; and a filter unit configured to use, as an input, the decoded signal prior to the filtering process and output a filtered decoded signal, wherein the filter unit is configured to perform clipping processing on a differential value between a reference pixel value and a pixel value of the decoded signal prior to the filtering process such that an absolute value of the differential value is less than or equal to a predefined threshold value, and to generate the filtered decoded signal through the linear weighted addition of the value after the clipping processing is performed, the filter coefficient and the pixel value of the decoded signal prior to the filtering process, the threshold value is set for each class and each filter coefficient, the threshold value for a luma signal is set to be equal to the threshold value for a chroma signal regardless of an internal bit depth, and the threshold value is defined such that when the internal bit depth is increased by 1, the threshold is doubled.

2. An image decoding method, comprising:

inputting a decoded signal prior to a filtering process and determining which class of filter is to be used;

determining a filter coefficient for each class; and using, as an input, the decoded signal prior to the filtering process and outputting a filtered decoded signal, wherein performing clipping processing on a differential value between a reference pixel value and a pixel value of the decoded signal prior to the filtering process such that an absolute value of the differential value is less than or equal to a predefined threshold value, and the filtered decoded signal is generated through the linear weighted addition of the value after the clipping processing is performed, the filter coefficient and the pixel value of the decoded signal prior to the filtering process, the threshold value is set for each class and each filter coefficient, the threshold value for a luma signal is set to be equal to the threshold value for a chroma signal regardless of an internal bit depth, and the threshold value is defined such that when the internal bit depth is increased by 1, the threshold is doubled.

3. A program stored on a non-transitory computer readable medium for causing a computer to function as an image decoding device, the image decoding device comprising:

a class determination unit configured to use, as an input, a decoded signal prior to a filtering process and determine which class of filter is to be used;

a parameter determination unit configured to determine a filter coefficient for each class; and a filter unit configured to use, as an input, the decoded signal prior to the filtering process and output a filtered decoded signal, wherein the filter unit is configured to perform clipping processing on a differential value between a reference pixel value and a pixel value of the decoded signal prior to the filtering process such that an absolute value of the differential value is less than or equal to a predefined threshold value, and to generate the filtered decoded signal through the linear weighted addition of the value after the clipping processing is performed, the filter coefficient and the pixel value of the decoded signal prior to the filtering process;

the threshold value is set for each class and each filter coefficient, the threshold value for a luma signal is set to be equal to the threshold value for a chroma signal regardless of an internal bit depth, and the threshold value is defined such that when the internal bit depth is increased by 1, the threshold is doubled.

* * * * *